US012260765B2

(12) United States Patent
S et al.

(10) Patent No.: US 12,260,765 B2
(45) Date of Patent: Mar. 25, 2025

(54) SYSTEMS AND METHODS FOR ALERTING WHEN AN INTRUDER TREND VECTOR IS PREDICTED TO INTERCEPT WITH AN AIRCRAFT TAXI PATH

(71) Applicant: HONEYWELL INTERNATIONAL INC., Charlotte, NC (US)

(72) Inventors: Anoop S, Bangalore (IN); Mohammed Ibrahim Mohideen, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 295 days.

(21) Appl. No.: 17/663,467

(22) Filed: May 16, 2022

(65) Prior Publication Data

US 2023/0093956 A1 Mar. 30, 2023

(30) Foreign Application Priority Data

Sep. 30, 2021 (IN) ............................. 202111044413

(51) Int. Cl.
*G08G 5/00* (2006.01)

(52) U.S. Cl.
CPC ......... *G08G 5/0008* (2013.01); *G08G 5/0021* (2013.01); *G08G 5/0034* (2013.01); *G08G 5/0078* (2013.01)

(58) Field of Classification Search
CPC .. G08G 5/0008; G08G 5/0021; G08G 5/0034; G08G 5/0078
See application file for complete search history.

(56) References Cited

U.S. PATENT DOCUMENTS

| | | | | |
|---|---|---|---|---|
| 8,335,638 | B2 | 12/2012 | Ridenour et al. | |
| 8,742,952 | B1 * | 6/2014 | Bold | G08G 5/0078 340/436 |
| 9,711,053 | B1 | 7/2017 | Williamson et al. | |
| 2010/0217509 | A1 * | 8/2010 | Ridenour | G08G 5/0021 701/120 |
| 2013/0342373 | A1 | 12/2013 | Marczi et al. | |
| 2016/0052641 | A1 * | 2/2016 | Olofinboba | G08G 5/065 340/978 |
| 2016/0063869 | A1 | 3/2016 | Kathirvel et al. | |
| 2016/0196754 | A1 | 7/2016 | Surace | |
| 2018/0061252 | A1 * | 3/2018 | Feng | G01S 13/878 |
| 2018/0357911 | A1 * | 12/2018 | Chartier | G08G 5/065 |
| 2020/0090531 | A1 | 3/2020 | Baladhandapani et al. | |

* cited by examiner

*Primary Examiner* — Anne Marie Antonucci
*Assistant Examiner* — Luis G Del Valle
(74) *Attorney, Agent, or Firm* — Lorenz & Kopf LLP

(57) ABSTRACT

A system and method for alerting when a trend vector associated with a traffic aircraft is predicted to intercept a travel route of an ownship aircraft. A control module receives real-time aircraft state data, flight plan data, and traffic data associated with the traffic aircraft. The control module processes these data and constructs the travel route of the ownship aircraft from the current location to the intended destination The control module generates the trend vector associated with the traffic aircraft, predicts a location of an intersection of the trend vector and the travel route, determines an amount of time it will take for the ownship aircraft to reach the location of the intersection, and generates display commands that cause the display device to generate an alert that visually distinguishes the location on the image based at least in part on the amount of time.

20 Claims, 3 Drawing Sheets

SYSTEMS AND METHODS FOR ALERTING WHEN AN INTRUDER TREND VECTOR IS PREDICTED TO INTERCEPT WITH AN AIRCRAFT TAXI PATH

CROSS-REFERENCE TO RELATED APPLICATIONS

The present application claims benefit of prior filed India Provisional Patent Application No. 202111044413, filed Sep. 30, 2021, which is hereby incorporated by reference herein in its entirety.

TECHNICAL FIELD

The technical field generally relates to navigational aids, and more particularly relates to systems and methods for alerting when an intruder trend vector is predicted to intercept with an aircraft taxi path.

BACKGROUND

Runway incursions are undesirable events that have the potential to occur during ground operations. While some potential incursions can be viewed within a field of view of the pilot, not all can. An undesirable runway incursion can occur when an intruder traffic is not within the field of view of the aircraft; this threat can be compounded when there is only a short amount of time to correct for it.

Accordingly, improved systems and methods that alert when an intruder trend vector is predicted to intercept with an ownship taxi path are desirable. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for alerting, in an ownship aircraft, when a trend vector associated with a traffic aircraft that is external to the ownship aircraft is predicted to intercept a travel route of the ownship aircraft, includes a control module. The control module is operationally coupled to receive real-time aircraft state data, flight plan data, and traffic data associated with the traffic aircraft. The real-time aircraft state data includes a current location, a current heading, and a current speed of the ownship aircraft, and the flight plan data includes an intended destination of the ownship aircraft. The control module is configured to: process the real-time aircraft state data, the flight plan data, and the traffic data; construct the travel route of the ownship aircraft from the current location to the intended destination; generate display commands that cause a display device to render an image showing the ownship aircraft at the current location and at the current heading; generate the trend vector associated with the traffic aircraft; predict a location of an intersection of the trend vector and the travel route; determine an amount of time it will take for the ownship aircraft, at the current location, the current heading, and the current speed, to reach the location of the intersection; and generate display commands that cause the display device to generate an alert that visually distinguishes the location on the image based at least in part on the amount of time.

In another embodiment, a system for alerting, in an ownship aircraft, when a trend vector associated with a traffic aircraft that is external to the ownship aircraft is predicted to intercept a travel route of the ownship aircraft, includes a real-time aircraft state data source, a flight plan data source, a traffic data source, an airport feature data source, and a control moduled. The real-time aircraft data source is configured to supply real-time aircraft state data, where the real-time aircraft state data includes a current location, a current heading, and a current speed of the ownship aircraft. The flight plan data source is configured to supply flight plan data, where the flight plan data includes an intended destination of the ownship aircraft. The traffic data source is configured to supply traffic data associated with the traffic aircraft. The airport feature data source is configured to supply airport feature data, where the airport feature data is representative of an airport field. The control module is operationally coupled to receive the real-time aircraft state data, the flight plan data, and the traffic data, and is configured to: process the real-time aircraft state data, the flight plan data, the traffic data, and the airport field data; construct the travel route of the ownship aircraft from the current location to the intended destination; generate display commands that cause a display device to render an image showing the ownship aircraft at the current location and at the current heading on the airport field; generate the trend vector associated with the traffic aircraft; predict a location of an intersection of the trend vector and the travel route; determine if the traffic aircraft is out of a field of view of the image; determine an amount of time it will take for the ownship aircraft, at the current location, the current heading, and the current speed, to reach the location of the intersection; generate display commands that cause the display device to generate an alert that visually distinguishes the location on the image based at least in part on the amount of time; and when the traffic aircraft is out of the field of view of the image, generate display commands that cause the display device to render the trend vector as a dotted line that extends from the location of the intersection toward the traffic aircraft.

In yet another embodiment. a method for alerting, in an ownship aircraft, when a trend vector associated with a traffic aircraft that is external to the ownship aircraft is predicted to intercept a travel route of the ownship aircraft, includes the steps of: receiving, in a control module, real-time aircraft state data, flight plan data, and traffic data associated with the traffic aircraft, the real-time aircraft state data including a current location, a current heading, and a current speed of the ownship aircraft, the flight plan data including an intended destination of the ownship aircraft; processing, in the control module, the real-time aircraft state data, the flight plan data, and the traffic data; constructing, in the control module, the travel route of the ownship aircraft from the current location to the intended destination; generating display commands, in the control module, that cause a display device to render an image showing the ownship aircraft at the current location and at the current heading; generating, in the control module, the trend vector associated with the traffic aircraft; predicting, in the control module, a location of an intersection of the trend vector and the travel route; determining, in the control module, an amount of time it will take for the ownship aircraft, at the current location, the current heading, and the current speed, to reach the location of the intersection; and generating display commands, in the control module, that cause the display device to generate an alert that visually distinguishes the location on the image based at least in part on the amount of time.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, it is desirable to update and improve upon navigation systems to add alerting when an intruder trend vector is predicted to intercept with an ownship taxi path.

Figure 1:
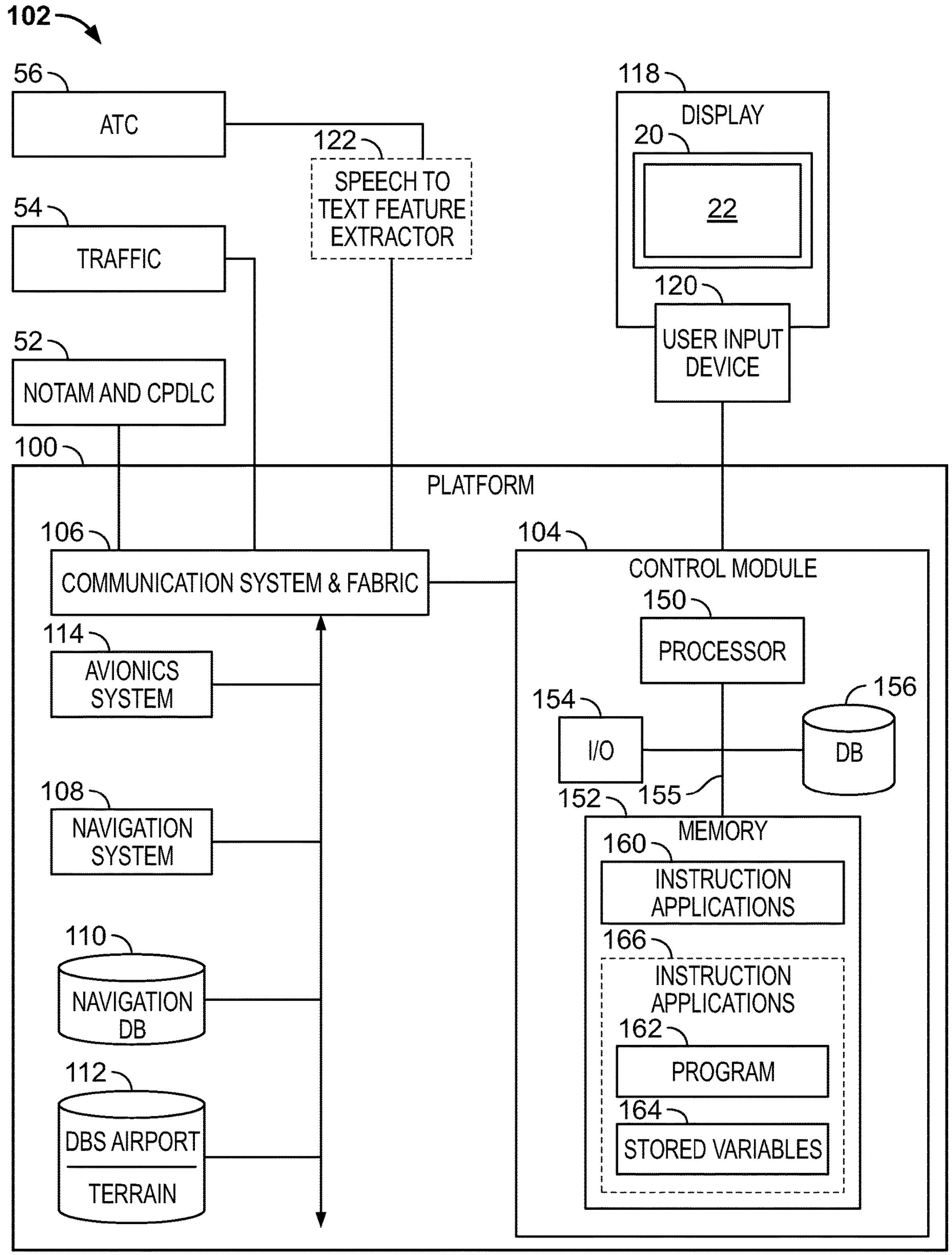
FIG. 1 is a block diagram of a system for alerting when an intruder trend vector is predicted to intercept with an ownship taxi path, in accordance with an exemplary embodiment.

Exemplary embodiments provide a technical solution to this problem in the form of a control module (FIG. 1, 104). The disclosed control module operates on available input and evaluates trend vectors transmitted from traffic that is nearby the ownship to predict whether the traffic will intercept with the ownship taxi path. The figures and descriptions below provide more detail.

Turning now to FIG. 1, in an embodiment, the system for alerting when an intruder trend vector is predicted to intercept with an ownship taxi path 102 (also referred to herein as "system" 102) is generally associated with a mobile platform 100. In various embodiments, the mobile platform 100 is an aircraft, and is referred to as aircraft 100. The system 102 embodies a control module 104. In some embodiments, the control module 104 may be integrated within a preexisting mobile platform management system, avionics system, cockpit display system (CDS), flight controls system (FCS), or aircraft flight management system (FMS). Although the control module 104 is shown as an independent functional block, onboard the aircraft 100, in other embodiments, it may exist in an electronic flight bag (EFB) or portable electronic device (PED), such as a tablet, cellular phone, or the like. In embodiments in which the control module is within an EFB or a PED, the display system 118 and user input device 120 may also be part of the EFB or PED.

The control module 104 may be operationally coupled to any combination of the following aircraft systems: a communication system and fabric 106; a source of real-time aircraft state data, such as a navigation system 108; a source of prescribed flight plan data, such as a navigation database (NavDB 110); one or more databases 112; a display system 118; and a user input device 120. The control module 104 is communicatively coupled to a source of notice to airmen (NOTAM 52) data, air traffic control 56, and a source of traffic data 54, such as automatic dependent surveillance broadcast (ADS-B) and traffic information service broadcast (TIS-B). In various embodiments, the control module 104 is additionally operationally coupled to one or more avionics systems 114, and a speech to text converter/features extractor 122. The functions of these aircraft systems, and their interaction, are described in more detail below.

Real-time aircraft state data may include any of: an instantaneous location (e.g., the latitude, longitude, orientation), an instantaneous heading (i.e., the direction the aircraft is traveling in relative to some reference), a flight path angle, a vertical speed, a ground speed, an instantaneous altitude (or height above ground level), and a current phase of flight of the aircraft 100. As used herein, "real-time" is interchangeable with current and instantaneous. In some embodiments, the real-time aircraft state data is generated by the navigation system 108. The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. The data provided by the navigation system 108 is referred to as navigation data (also referred to herein as the real-time aircraft state data). The real-time aircraft state data is made available, generally by way of the communication system and fabric 106, so other components, such as the control module 104 and the display system 118, may further process and/or handle the aircraft state data.

Prescribed flight plan (FP) data may include a series of intended geospatial midpoints between a departure and an arrival, as well as performance data associated with each of the geospatial midpoints (non-limiting examples of the performance data include intended navigation data, such as: intended airspeed, intended altitude, intended acceleration, intended flight path angle, and the like). A source of a prescribed flight plan data may be a storage location or a user input device. In various embodiments, the navigation database, NavDB 110, is the source of a prescribed flight plan. The navigation database (NavDB 110) is a storage location that may also maintain a database of flight plans, and/or information regarding terrain and airports and/or other potential landing locations (or destinations) for the aircraft 100.

In various embodiments, the avionics systems 114 provide aircraft performance data and sensed data for a variety of aircraft 100 subsystems. Examples of the aircraft performance data include: engine thrust level, fuel level, flap configuration, braking status, temperature control system status, and the like. As may be appreciated, the avionics systems 114 may therefore include a variety of on-board detection sensors and may be operationally coupled to the control module 104, central management computer, or FMS.

The communications system and fabric 106 is configured to support instantaneous (i.e., real time or current) communications between onboard systems (i.e., the navigation system 108, the navigation database 110, the database 112, and the avionics systems 114), the control module 104, and the one or more external data source(s). As a functional block, the communications system and fabric 106 represents one or more transmitters, receivers, and the supporting communications hardware and software required for components of the system 102 to communicate as described herein. In various embodiments, the communications system and fabric 106 may have additional communications not directly relied upon herein, such as bidirectional pilot-to-ATC (air traffic control) communications via a datalink; support for an automatic dependent surveillance broadcast system (ADS-B); a communication management function (CMF) uplink; a terminal wireless local area network (LAN) unit (TWLU); an instrument landing system (ILS); and, any other suitable radio communication system that supports communications between the aircraft 100 and the various external source(s). In various embodiments, the control module 104 and communications system and fabric 106 also support controller pilot data link communications (CPDLC) with CPDLC 52, such as through an aircraft communication addressing and reporting system (ACARS) router; in various embodiments, this feature may be referred to as a communications management unit (CMU) or communications management function (CMF). In summary, the communications system and fabric 106 may allow the aircraft 100 and the control module 104 to receive information that would otherwise be unavailable to the pilot and/or co-pilot using only the onboard systems.

External sources communicate with the aircraft 100 and the control module 104, generally, by way of the communication system and fabric 106. External sources include: NOTAM 52 (which includes CPDLC 52), traffic data system (s) 54; air traffic control (ATC) 56; and a variety of other radio inputs, such as source(s) of the radio signals used by the an instrument landing system (ILS), and weather and surface data sources, such as a source for meteorological terminal aviation weather reports (METARS), automatic terminal information service (ATIS), datalink ATIS (D-ATIS), automatic surface observing system (ASOS). The traffic data system(s) 54 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective instantaneous location and heading, vertical speed, ground speed, instantaneous altitude, and aircraft identification.

The user input device 120 and the control module 104 are cooperatively configured to allow a user (e.g., a pilot, co-pilot, or crew member) to interact with display devices in the display system 118 and/or other elements of the system 102, as described in greater detail below. Depending on the embodiment, the user input device 120 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 120 is configured as a touchpad or touchscreen, it may be integrated with the display system 118. As used herein, the user input device 120 may be used by a pilot to communicate with ATC 56, to modify or upload the program product 166, etc. In various embodiments, the display system 118 and user input device 120 are onboard the aircraft 100 and are also operationally coupled to the communication system and fabric 106. In some embodiments, the control module 104, user input device 120, and display system 118 are configured as a control display unit (CDU).

In various embodiments, the control module 104, alone, or as part of a central management computer (CMS) or a flight management system (FMS), draws upon data and information from the navigation system 108 and the NavDB 110 to provide real-time flight guidance for aircraft 100. The real time flight guidance may be provided to a user by way of commands for the display system 118, an audio system, or the like. For example, the control module 104 may compare an instantaneous position and heading of the aircraft 100 with the prescribed flight plan data for the aircraft 100 and generate display commands to render images 22 showing these features. The control module 104 may further associate a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like) with the instantaneous position and heading of the aircraft 100 and/or with the navigation plan for the aircraft 100.

The control module 104 generates display commands for the display system 118 to cause the display device 20 to render thereon the image 22, comprising various graphical user interface elements, tables, icons, alerts, menus, buttons, and pictorial images, as described herein. The display system 118 is configured to continuously receive and process the display commands from the control module 104. The display system 118 includes a display device 20 for presenting an image 22. In various embodiments described herein, the display system 118 includes a synthetic vision system (SVS), and the image 22 is a SVS image. In exemplary embodiments, the display device 20 is realized on one or more electronic display devices configured as any combination of: a head up display (HUD), an alphanumeric display, a vertical situation display (VSD) and a lateral navigation display (ND).

Renderings on the display system 118 may be processed by a graphics system, components of which may be integrated into the display system 118 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes. In an embodiment, the Bokeh effect is used for emphasizing relevant signage with respect to remaining signage. The control module 104 may be said to display various images and selectable options described herein. In practice, this may mean that the control module 104 generates display commands, and, responsive to receiving the display commands from the control module 104, the display system 118 displays, renders, or otherwise visually conveys on the display device 20, the graphical images associated with operation of the aircraft 100, and specifically, the graphical images as directed by the control module 104.

In addition to providing flight guidance, in various embodiments, any combination of the control module 104, user input device 120, avionics systems 114, and communication system and fabric 106, may be coupled to the display system 118 such that the display system 118 may additionally generate or render, on the display device 20, real-time avionics systems information associated with respective aircraft 100 systems and components.

In various embodiments, the control module 104 is additionally operationally coupled to one or more databases 112. The databases 112 may include one or more of: a runway awareness and advisory system (RAAS) database and an Aerodrome Mapping Database (AMDB). In various embodiments, each of these may include an airport features database, having therein maps and geometries, including runway records with corresponding runway threshold locations. The AMDB may also include airport status data for the runways and/or taxi paths at the airport; the airport status data indicating operational status and directional information for the taxi paths (or portions thereof). In some embodiments, the databases 112 may include a terrain database, having therein topographical information for the airport and surrounding environment.

The control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as a computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 120. During operation, the processor 150 loads and executes one or more programs, algorithms and rules embodied as instructions and applications 160 contained within the memory 152 and, as such, controls the general operation of the control module 104 as well as the system 102.

The novel program 162 includes rules and instructions which, when executed, convert the processor 150/memory 152/database 156 configuration into the control module 104, which is a novel "contextual alerts" control module that performs the functions, techniques, and processing tasks associated with the operation of the system 102. Novel program 162 and associated stored variables 164 may be stored in a functional form on computer readable media, for example, as depicted, in memory 152. While the depicted exemplary embodiment is described in the context of a fully functioning computer system, those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

In executing the process described herein, the processor 150 specifically loads the instructions embodied in the program 162, thereby being programmed with program 162. During execution of program 162, the processor 150, the memory 152, and a database DB 156 form a novel dynamic processing engine that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the communication system and fabric 106. The I/O interface 154 may include one or more network interfaces and can be implemented using any suitable method and apparatus. In various embodiments, the I/O interface 154 is configured to support communication from an external system driver and/or another computer system. In one embodiment, the I/O interface 154 is integrated with the communication system and fabric 106 and obtains data from external data source(s) directly. Also, in various embodiments, the I/O interface 154 may support communication with technicians, and/or one or more storage interfaces for direct connection to storage apparatuses, such as the database 156.

In some embodiments, the database 156 is part of the memory 152. In various embodiments, the database 156 and the database 112 are integrated, either within the control module 104 or external to it. Accordingly, in some embodiments, the airport features data and terrain features are pre-loaded and internal to the control module 104.

Figure 2:
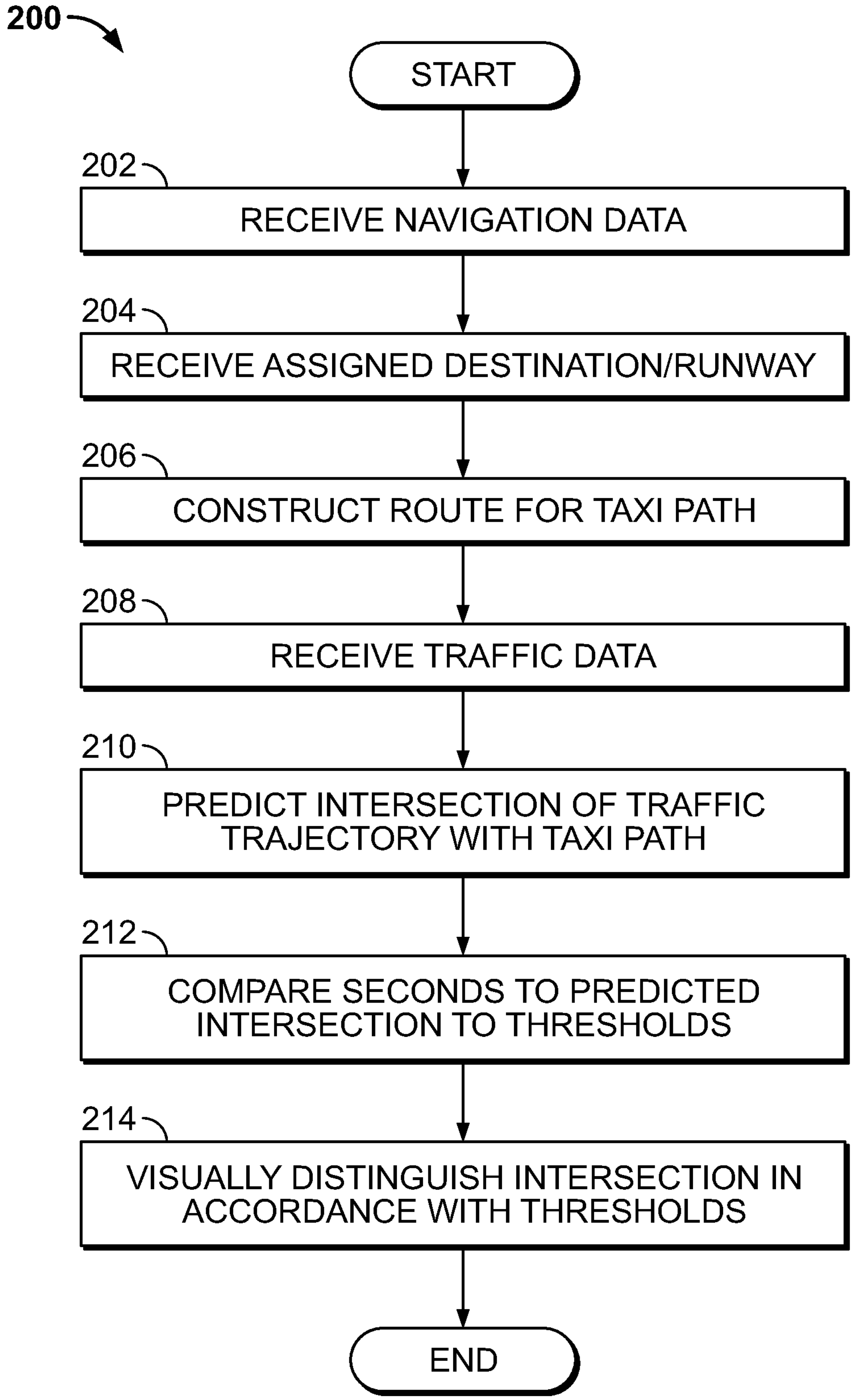
FIG. 2 is a flow chart for a method for alerting when an intruder trend vector is predicted to intercept with an ownship taxi path, in accordance with an exemplary embodiment.

The system 102 may make its determinations and selections in accordance with a method such as method 200 of FIG. 2. With continued reference to FIG. 1, a flow chart is provided for a method 200 for providing a system 102, in accordance with various exemplary embodiments. Method 200 represents various embodiments of a method for selecting an accurate runway record. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 if the intended overall functionality remains intact.

Figure 3:
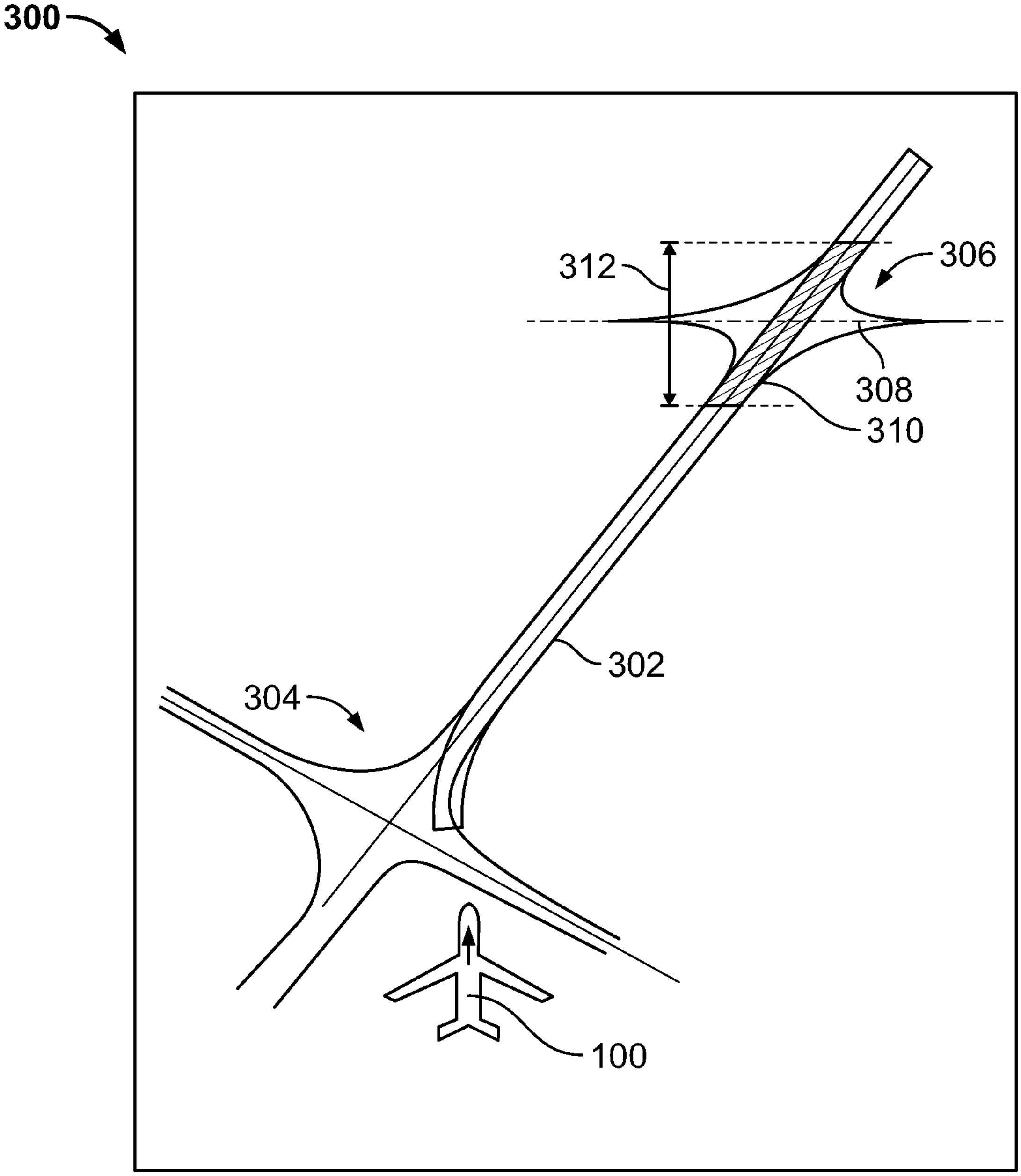
FIG. 3 is an illustration of an avionic display showing an alert when an intruder trend vector is predicted to intercept with an ownship taxi path, in accordance with an exemplary embodiment.

At 202, the method receives navigation data. At 204, the intended destination or runway for the ownship aircraft is received. With reference to FIG. 3, and with continued reference to FIG. 2, at 206, the system 102 constructs a route (i.e., the taxi path 302) for the aircraft 100 and displays it on an avionic display 300. It is assumed that the control module 104 has already received the destination or the assigned runway; constructed, using airport feature data, a route for the aircraft 100 to travel from its current location to its destination or its assigned runway (the route including a travel direction); and generated display commands for rendering an image showing the aircraft 100 at the current location and heading on the airport field. The images 22 generated by the display system 118, responsive to display commands, and are understood to be based on current aircraft state data and to be dynamically modified responsive to continuously obtaining and processing the current aircraft state data. The images 22 may also be continuously updated to reflect real-time changes with respect to terrain, airport features, weather, and neighbor traffic/relevant traffic.

The avionic display 300 also displays intersection 304, at which the aircraft 100 is currently entering, and intersection 306, which is further down the path of the aircraft 100. At 208, traffic data is received from external sources such as traffic source 52. At 210, the system 102 projects the trend vector 308 of a traffic that is off screen (off screen to the right in this example) and on trend to intercept with the aircraft 100 in the intersection 306. The system 102 predicts an intersection of the traffic with the taxi path 302.

At 212, the system converts the projected intersection at intersection 306 into an amount of time (time delay) until the intersection at intersection 306 will occur, barring further action, and compares the time delay to predefined thresholds. A first predefined threshold may represent a caution alert and a second predefined threshold (a smaller amount of time than that of the first predefined threshold) may define a critical alert. In an example, the first time delay is in the range of 7-10 seconds and the second time delay is in the range of 5-6 seconds.

At 214, the system 102 visually distinguishes the predicted intersection on the avionic display 22. The system 102 may reference predefined display rules to determine a rendering technique to perform step 214. For example, the color yellow or amber may be used for the cautionary alert and the color red may be used for the critical alert. In addition, the predefined display rules may specify the size and shape of the visual alert. In an example, as shown in FIG. 3, the size of the visual alert 310 includes an area with a width equal to a width of the displayed the taxi path 302, and a length that is equal to an entire length 312 of the intersection. In an embodiment, upon determining that the traffic is out of a field of view of the image, the system 102 renders the trend vector associated with the traffic with a dotted or dashed line.

The avionic display 300 of FIG. 3 of provides a non-limiting example of the provided technological enhancement over other alert systems. As used herein, the intended/assigned destination may also be an assigned taxiway, and the assigned runway may include information for the runway or taxi way, such as an assigned gate and an exit for the runway or taxiway.

In some embodiments, the system 102 includes a speech-to-text converter 122, each operationally coupled to the control module 104. In these embodiments, the control module 104 is further configured to: receive the intended destination or the assigned runway as speech, embedded within a speech command from air traffic control (ATC) or from a CPDLC command; convert the speech command into text; and extract the intended destination or assigned runway from the text.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 or software application) and, further, that the present teachings apply to the program product regardless of the particular type of computer-readable media (e.g., hard drive, memory card, optical disc, etc.) employed to carry-out its distribution.

Terms such as “comprise,” “include,” “have,” and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for alerting, in an ownship aircraft, when a trend vector associated with a traffic aircraft that is external to the ownship aircraft is predicted to intercept a travel route of the ownship aircraft, the system comprising:

a control module operationally coupled to receive real-time aircraft state data, flight plan data, and traffic data associated with the traffic aircraft, the real-time aircraft state data including a current location, a current heading, and a current speed of the ownship aircraft, the flight plan data including an intended destination of the ownship aircraft, the control module configured to:

process the real-time aircraft state data, the flight plan data, and the traffic data;

construct the travel route of the ownship aircraft from the current location to the intended destination;

generate display commands that cause a display device to render an image showing the ownship aircraft at the current location and at the current heading;

generate the trend vector associated with the traffic aircraft;

predict a location of an intersection of the trend vector and the travel route;

determine an amount of time it will take for the ownship aircraft, at the current location, the current heading, and the current speed, to reach the location of the intersection; and generate display commands that cause the display device to generate an alert that visually distinguishes the location of the intersection on the image by rendering the location of the intersection in different colors depending on a type of alert and based at least in part on the amount of time.

2. The system of claim 1, wherein the control module is further configured to:

process the traffic data to determine if the traffic aircraft is out of a field of view of the image; and when the traffic aircraft is out of the field of view of the image, generate display commands that cause the display device to render the trend vector as a dotted line that extends from the location of the intersection toward the traffic aircraft.

3. The system of claim 1, wherein the control module is further configured to:

conduct comparisons of the amount of time to a plurality of threshold time values; and generate display commands that cause the display device to visually distinguish the alert based on the comparisons.

4. The system of claim 3, wherein the control module is further configured to:

generate display commands that cause the display device to render the alert using the different colors based on the comparisons.

5. The system of claim 4, wherein the plurality of threshold time values include a first threshold time value and a second threshold time value, the first threshold time value greater than the second threshold time value.

6. The system of claim 5, wherein the control module is further configured to:

generate display commands that cause the display device to render the alert using a first color when the amount of time is less than the first threshold time value and greater than the second threshold time value; and generate display commands that cause the display device to render the alert using a second color when the amount of time is less than the second threshold time value.

7. The system of claim 3, wherein the control module is further configured to generate display commands that cause the display device to render the alert as a predefined size and shaped.

8. The system of claim 1, further comprising:

a real-time aircraft state data source configured to supply the real-time aircraft state data;

a flight plan data source configured to supply the flight plan data; and a traffic data source configured to supply the traffic data.

9. The system of claim 1, wherein:

the control module is further operationally coupled to receive airport feature data, the airport feature data representative of an airport field; and the control module is further configured to process the airport feature data and generate display commands that cause the display device to render the image showing the ownship aircraft at the current location and heading on the airport field.

10. The system of claim 9, further comprising:

a real-time aircraft state data source configured to supply the real-time aircraft state data;

a flight plan data source configured to supply the flight plan data;

a traffic data source configured to supply the traffic data; and an airport feature data source configured to supply the airport feature data.

11. The system of claim 1, wherein the location of the intersection includes a discernable width and length of the intersection defining a discernable area of the intersection that is rendered in the different colors.

12. The system of claim 11, wherein the area is a two-dimensional shape, a polygon, or a quadrilateral.

13. A system for alerting, in an ownship aircraft, when a trend vector associated with a traffic aircraft that is external to the ownship aircraft is predicted to intercept a travel route of the ownship aircraft, the system comprising:

a real-time aircraft state data source configured to supply real-time aircraft state data, the real-time aircraft state data including a current location, a current heading, and a current speed of the ownship aircraft;

a flight plan data source configured to supply flight plan data, the flight plan data including an intended destination of the ownship aircraft;

a traffic data source configured to supply traffic data associated with the traffic aircraft;

an airport feature data source configured to supply airport feature data, the airport feature data representative of an airport field; and a control module operationally coupled to receive the real-time aircraft state data, the flight plan data, and the traffic data, the control module configured to:

process the real-time aircraft state data, the flight plan data, the traffic data, and the airport field data;

construct the travel route of the ownship aircraft from the current location to the intended destination;

generate display commands that cause a display device to render an image showing the ownship aircraft at the current location and at the current heading on the airport field;

generate the trend vector associated with the traffic aircraft;

predict a location of an intersection of the trend vector and the travel route;

determine if the traffic aircraft is out of a field of view of the image;

determine an amount of time it will take for the ownship aircraft, at the current location, the current heading, and the current speed, to reach the location of the intersection;

generate display commands that cause the display device to generate an alert that visually distinguishes the location of the intersection on the image by rendering the location of the intersection in different colors depending on a type of alert and based at least in part on the amount of time; and when the traffic aircraft is out of the field of view of the image, generate display commands that cause the display device to render the trend vector as a dotted line that extends from the location of the intersection toward the traffic aircraft.

14. The system of claim 13, wherein the control module is further configured to:

conduct comparisons of the amount of time to a plurality of threshold time values; and generate display commands that cause the display device to visually distinguish the alert based on the comparisons.

15. The system of claim 14, wherein the control module is further configured to:

generate display commands that cause the display device to render the alert using the different colors based on the comparisons.

16. The system of claim 15, wherein the plurality of threshold time values include a first threshold time value and a second threshold time value, the first threshold time value greater than the second threshold time value.

17. The system of claim 16, wherein the control module is further configured to:

generate display commands that cause the display device to render the alert as a predefined size and shaped;

generate display commands that cause the display device to render the alert using a first color when the amount of time is less than the first threshold time value and greater than the second threshold time value; and generate display commands that cause the display device to render the alert using a second color when the amount of time is less than the second threshold time value.

18. A method for alerting, in an ownship aircraft, when a trend vector associated with a traffic aircraft that is external to the ownship aircraft is predicted to intercept a travel route of the ownship aircraft, the method comprising the steps of:

receiving, in a control module, real-time aircraft state data, flight plan data, and traffic data associated with the traffic aircraft, the real-time aircraft state data including a current location, a current heading, and a current speed of the ownship aircraft, the flight plan data including an intended destination of the ownship aircraft;

processing, in the control module, the real-time aircraft state data, the flight plan data, and the traffic data;

constructing, in the control module, the travel route of the ownship aircraft from the current location to the intended destination;

generating display commands, in the control module, that cause a display device to render an image showing the ownship aircraft at the current location and at the current heading;

generating, in the control module, the trend vector associated with the traffic aircraft;

predicting, in the control module, a location of an intersection of the trend vector and the travel route;

determining, in the control module, an amount of time it will take for the ownship aircraft, at the current location, the current heading, and the current speed, to reach the location of the intersection; and generating display commands, in the control module, that cause the display device to generate an alert that visually distinguishes the location of the intersection on the image by rendering the location of the intersection in different colors depending on a type of alert and based at least in part on the amount of time.

19. The method of claim 18, further comprising:

processing the traffic data, in the control module, to determine if the traffic aircraft is out of a field of view of the image; and when the traffic aircraft is out of the field of view of the image, generating display commands, in the control module, that cause the display device to render the trend vector as a dotted line that extends from the location of the intersection toward the traffic aircraft.

20. The method of claim 18, further comprising:

conducting comparisons, in the control module, of the amount of time to a plurality of threshold time values; and generating display commands, in the control module, that cause the display device to visually distinguish the alert based on the comparisons.

* * * * *